(12) United States Patent
Beitman (10) Patent No.: US 7,464,101 B2
(45) Date of Patent: Dec. 9, 2008

(54) FUZZY ALPHANUMERIC SEARCH APPARATUS AND METHOD

(75) Inventor: Bruce Allan Beitman, Westerville, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 275 days.

(21) Appl. No.: 11/401,809

(22) Filed: Apr. 11, 2006

(65) Prior Publication Data

US 2007/0239752 A1    Oct. 11, 2007

(51) Int. Cl.
*G06F 7/00* (2006.01)
(52) U.S. Cl. .............................. 707/101; 707/6; 707/7; 707/100; 707/102
(58) Field of Classification Search ........................ None
See application file for complete search history.

(56) References Cited

U.S. PATENT DOCUMENTS

| | | | | |
|---|---|---|---|---|
| 6,515,598 B2 * | 2/2003 | Parenteau et al. | ............. | 341/60 |
| 6,523,041 B1 * | 2/2003 | Morgan et al. | ............... | 707/102 |
| 7,127,458 B1 * | 10/2006 | Mantripragada et al. | ....... | 707/6 |
| 2003/0220852 A1 * | 11/2003 | Back et al. | ..................... | 705/29 |
| 2005/0015524 A1 * | 1/2005 | Yamada | ....................... | 710/62 |

OTHER PUBLICATIONS

"Fuzzy Lookups and Groupings Provide Powerful Data Cleansing Capabilities" by Jay Nathan, MSDN magazine SQL Server 2005, Sep. 2005, pp. 87-92.

* cited by examiner

*Primary Examiner*—Khanh B Pham
*Assistant Examiner*—Andalib F Lodhi

(57) ABSTRACT

A fuzzy alphanumeric search apparatus searches for a search character string (e.g., MPN) in a source character string (CPN) database. The match is fuzzy since it only matches some of the MPN characters (referred to as tokens) against some of the CPN characters. Nearly all part numbers have a base number (base token) that is typically found at the beginning of the MPN. A base token and other tokens are generated, used to identify CPNs having the greatest total of MPN character position matches, and are outputted as a potential (fuzzy) CPN match list to the user. The user then determines if in fact a true CPN match is found in the fuzzy CPN list. The Fuzzy MPN match technique is significantly faster than manual wildcard searches.

6 Claims, 8 Drawing Sheets

Example – Create tokens (0805CS-820XKBC)

| Step | MCP | OG | EG | GCC | Token | Comment |
|---|---|---|---|---|---|---|
| 501 | 1 | 1 | Null | 1 | 0805CS | |
| 502 | 2 | 1 | Null | 2 | 805CS8 | |
| 503 | 3 | 1 | Null | 3 | 05CS82 | |
| 504 | 4 | 1 | Null | 4 | | Skip to 505 |
| 505 | 5 | Null | 2 | 1 | CS82 | |
| 506 | 6 | Null | 2 | 2 | S820 | |
| 507 | 7 | 3 | 2 | 3 | 820X | |
| 508 | 8 | 3 | 2 | 4 | | Skip to 509 |
| 509 | 8 | 3 | Null | 2 | 20XK | |
| 510 | 9 | 3 | 4 | 3 | 0XKB | |
| 511 | 10 | Null | 4 | 4 | | Skip to 512 |
| 512 | 10 | Null | 4 | 2 | XKBC | |
| 513 | 11 | 5 | 4 | 3 | KBC | |
| 514 | 12 | 5 | 4 | 4 | | Skip to 515 |
| 515 | 12 | 5 | Null | 2 | BC | |

Strip MPN of non Alpha Numerics

Starting MPN: 0805CS-820XKBC    converted MPN: 0805CS820XKBC

Build tokens from converted MPN

| | 610 MPNid | 620 Token | 630 Token length | 640 Character Position | 650 Odd Group | 660 Even Group |
|---|---|---|---|---|---|---|
| 601 | 233 | 0805CS | 6 | 1 | 1 | |
| 602 | 233 | 805CS8 | 6 | 2 | 1 | |
| 603 | 233 | 05CS82 | 6 | 3 | 1 | |

Skip to character 5, change group size

| | | | | | | |
|---|---|---|---|---|---|---|
| 604 | 233 | CS82 | 4 | 5 | | 2 |
| 605 | 233 | S820 | 4 | 6 | | 2 |
| 606 | 233 | 820X | 4 | 7 | 3 | 2 |
| 607 | 233 | 20XK | 4 | 8 | 3 | |
| 608 | 233 | 0XKB | 4 | 9 | 3 | 4 |
| 609 | 233 | XKBC | 4 | 10 | | 4 |
| 609a | 233 | KBC | 4 | 11 | 5 | 4 |
| 609b | 233 | BC | 4 | 12 | 5 | |

Fig. 7

FUZZY ALPHANUMERIC SEARCH APPARATUS AND METHOD

FIELD OF THE INVENTION

The present invention relates to the searching of alphanumeric databases and more particularly to a fuzzy search that uses subsets or tokens of the search character string to search a source character string database.

BACKGROUND OF THE INVENTION

The searching of alphanumeric databases for one or more search character strings can be a time consuming procedure. In one application, an electronics equipment company (e.g., Lucent) that produces many different products may use parts obtained from many different parts manufacturers. The company may also assign Company Part Numbers (CPNs) that are different than the Manufacturers Part Numbers (MPNs). A problem exists when a Part Change Notice (PCN) process requires that the MPNs supplied by the parts manufacturer need to be found in the company's internal CPN database. The problem is that the part numbers MPNs provided by the manufacturer may be different than what is stored in the company's internal CPN database. Typically the PCN may contain hundreds of MPNs so that finding the MPNs in the company's internal CPN database can be a significant effort.

Traditionally a user does the look-up of these MPNs manually, one by one or with the use of "wildcards." A wildcard is a technique of searching for one or more groups of characters, where each group contains a predefine set of characters and the groups are separated by a group of non-defined characters. For example, one wild card may be AB***CDE, where you are looking in character strings for the predefined group of core characters AB and CDE that are separated by 3 non-defined characters. Thus, such a wildcard search would select the character strings such as ABXYZCDE and ABABCCDE as satisfying the search criteria. Utilizing wildcards to find matching MPNs is user dependant since the user has to select the core characters very carefully.

There are a number of problems with this manual wildcard approach. It can be quite time consuming working through a long PCN list (one PCN could take nearly a week to complete). It also has a high probability for error (parts could be easily missed). Any error could be quite expensive. If a MPN is discontinued and the Last Time Buy (LTB) is missed then the company's production could be disrupted and products not shipped.

Data cleansing techniques are known to eliminate duplication (Deduplication) improve data accuracy and reliability. One data cleansing technique is described in the article entitled "Fuzzy Lookups and Groupings Provide Powerful Data Cleansing Capabilities" by Jay Nathan, MSDN magazine SQL Server 2005, September 2005, pages 87-92, which is incorporated by reference herein. The Nathan article describes a duplication (Deduplication) process that use tokens (subsets of reference values) to search the different reference fields (name, address, etc.) of customer records to eliminate the duplication of customer records in a database. The Nathan article uses delimiters within the reference fields to identify search tokens. However, since the use of delimiters in manufacturers part numbers (MPN) are not reliable, the technique of using delimiters to identify tokens will not be reliable in searching an company's database for such MPN numbers. Additionally, since the location of the relevant characters of the MPN for match purposes do not align with the location of the relevant characters in the company's CPN, the techniques described in the Nathan article will not produce matches.

Thus, there is a continuing need for a reliable technique for searching a company's CPN database for MPN numbers.

SUMMARY OF THE INVENTION

In accordance with the present invention, a fuzzy alphanumeric search apparatus is disclosed for searching for a search character string (e.g., MPN) in a source character string database (e.g., a company's CPN database). My search technique, referred to, as a "fuzzy" matching technique, is intended to replicate how a well-qualified human would go about finding MPN matches in a CPN database. The match is fuzzy since it only matches some of the MPN characters (referred to as tokens) against some of the CPN characters. As such, the first step is to generate search base numbers (or tokens) from a MPN and to use it to search a company's CPN. database to generate a potential (fuzzy) CPN match list. Nearly all part numbers have a base number that is typically found at the beginning of the MPN. However, there is no base number standard used in part numbering. Additionally, while the base number tends to be in beginning of the MPN part number it is not a fixed length or located in a fixed position. A prefix can precede the base number and a suffix follows it. The suffix may provide additional details about the physical part. After the CPN database is searched using a variety of different search numbers (or tokens) generated from the MPN, the CPNs having the greatest total of MPN character position matches are determined and outputted as a potential (fuzzy) CPN match list to the user. The user then determines if in fact a true CPN match is found in the fuzzy CPN list. The Fuzzy MPN match is significantly faster than typical manual wildcard searches. The resulting fuzzy match list is a better-qualified (or bounded) list. Although the resulting fuzzy match list requires a qualified user to review (to verify real matches), the set is more accurate then a typical wild card search. As a result my technique drastically reduces a users quite time consuming manual work of identifying whether each of a plurality of MPNs has matches in a CPN database.

More particularly, in accordance with the present invention, apparatus is disclosed for searching for a search character string (MPN) in a source character string (CPN) database. The search MPN and source CPN character strings including a prefix P, a base B and a suffix S segment. The apparatus comprising converting means for stripping an inputted search MPN character string of a predefined group of non-alphanumeric group of characters to form a converted MPN character string;

token generating means for generating a first group of search tokens, numbering TPG, of MPN base tokens from the converted MPN character string to serve as search tokens, the number TPG of tokens in the first group of MPN base tokens being at least equal to the number of characters in a prefix segment Pn of the converted MPN character string, each MPN base token having a fixed length BTL of contiguous characters, where the fixed length BTL is a predetermined number of characters in the converted MPN character string which also are present in a converted CPN character string, and the first MPN base token beginning at a first character position of the converted MPN character string and each subsequent MPN base token beginning at an adjacent sequential character position of the converted MPN character string;

the CPN token database including said number, TPG, of CPN base tokens generated from the converted CPN character string formed from a source CPN character string, the CPN base tokens to serve as source tokens, the number TPG of CPN base tokens being at least equal to the number of characters in a prefix segment Pc of the converted CPN character string, each CPN base token having said fixed length BTL of contiguous characters, and the first CPN base token beginning at a first character position of the converted CPN character string and each subsequent CPN base token beginning at an adjacent sequential character position of the converted CPN character string;

matching means for searching the CPN token database using each of the MPN base tokens and identifying one or more CPN base tokens that match each of the MPN base tokens; and outputting means for outputting to a user a list of one or more CPN base tokens that match the MPN base tokens.

Other in embodiments, which are only operable on the MPN converter string when the matching means has found at least one CPN base token that matches a MPN base token, one or more second groups of non-base tokens of the MPN character string are generated and matched to non-base tokens of the CPN character string and the one or more source CPN character strings that produced the highest total number of character position matches with the search MPN character string is outputted to the user.

According to another aspect of the invention, a method is disclosed for searching for a search character string (MPN) in a source character string (CPN) database, the search MPN and source CPN character strings including a prefix P, a base B and a suffix S segment. The method comprising the steps of:

storing in a CPN token database a number, TPG, of CPN base tokens generated from the converted CPN character string formed from a source CPN character string, the CPN base tokens to serve as source tokens, the number TPG of CPN base tokens being at least equal to the number of characters in a prefix segment Pc of the converted CPN character string, each CPN base token having said fixed length BTL of contiguous characters, and the first CPN base token beginning at a first character position of the converted CPN character string and each subsequent CPN base token beginning at an adjacent sequential character position of the converted CPN character string;

stripping an inputted search MPN character string of a predefined group of non-alphanumeric group of characters to form a converted MPN character string;

generating a first group, numbering TPG, of MPN base tokens from the converted MPN character string to serve as search tokens, the number TPG of tokens in the first group of MPN base tokens being at least equal to the number of characters in a prefix segment Pn of the converted MPN character string, each MPN base token having a fixed length BTL of contiguous characters, where the fixed length BTL is a predetermined number of characters in the converted MPN character string which also are present in a converted CPN character string, and the first MPN base token beginning at a first character position of the converted MPN character string and each subsequent MPN base token beginning at an adjacent sequential character position of the converted MPN character string;

matching each of the MPN base tokens to the CPN token database and identifying one or more CPN base tokens that match each of the MPN base tokens; and outputting to a user a list of one or more CPN base tokens that match the MPN base tokens.

BRIEF DESCRIPTION OF THE DRAWINGS

Other aspects, features, and advantages of the present invention will become more fully apparent from the following detailed description, the appended claims, and the accompanying drawings in which:

In the following description, identical element designations in different figures represent identical elements. Additionally in the element designations, the first digit refers to the figure in which that element is first located (e.g., 101 is first located in FIG. 1).

DETAILED DESCRIPTION

Figure 1:
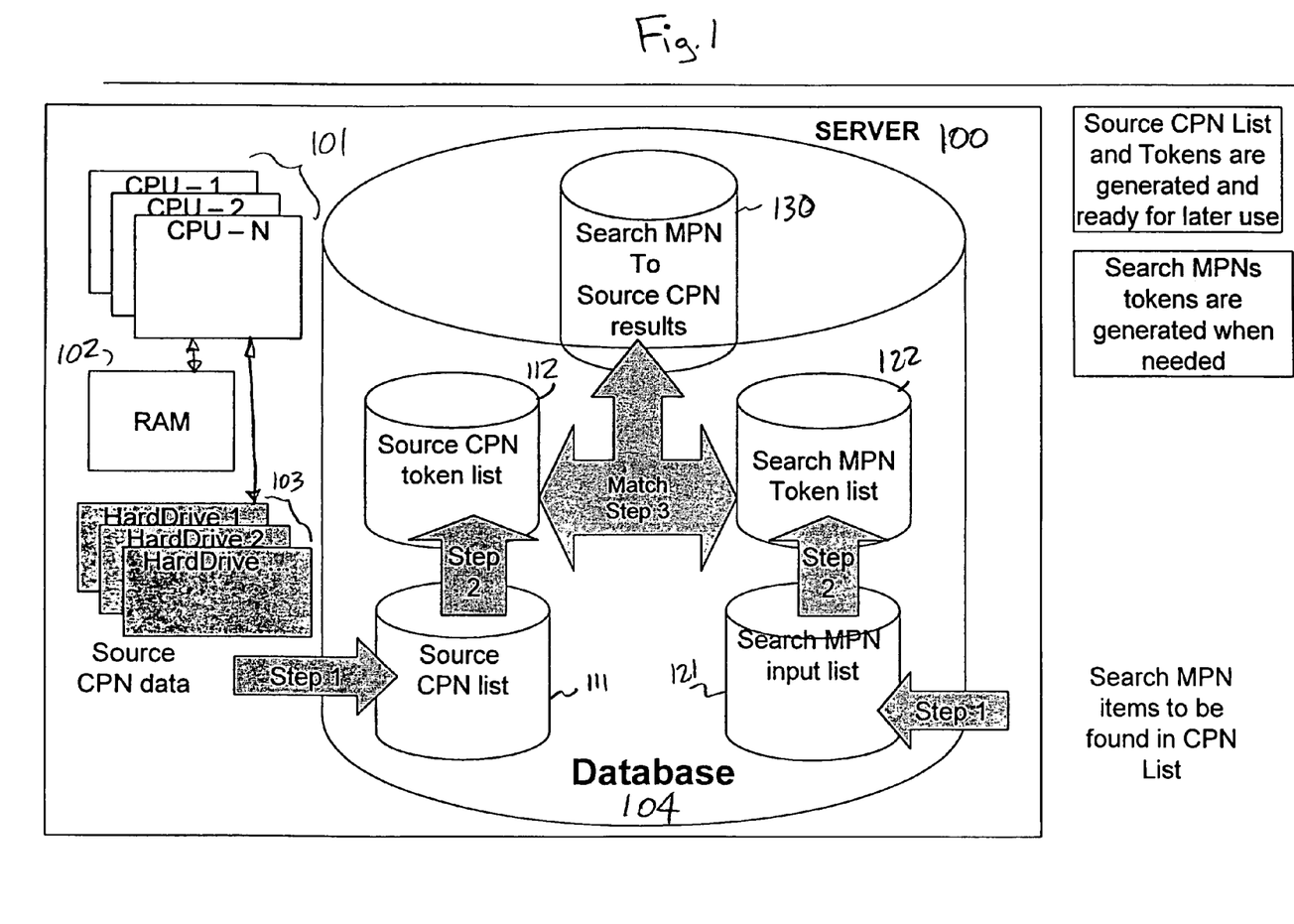
FIG. 1 is an illustrative block diagram of a server processor in which the fuzzy alphanumeric search apparatus of the present invention may be utilized.

Shown in FIG. 1 is an illustrative block diagram of a server 100 in which my novel fuzzy alphanumeric search apparatus may be facilitated. The server 100 includes one or more central processing units (CPUs) that connect to RAM 101 and to one or more hard drive memory units 102. The RAM 101 alone and/or together with the hard drive memory units 102 is used to store the data preparation algorithm (FIG. 2), token generation algorithm (FIGS. 3A and 3B), token matching and grading algorithm (FIG. 4), and associated tables and lists. The one or more hard drive memory units 102 store the database 104 that includes the character strings of company parts numbers (CPNs) and the manufacture parts numbers (MPNs). It should be noted that the same flow charts of FIGS. 2, 3A, 3B, and 4 are used to prepare and match tokens for both the CPNs and the MPNs. However, since the preparation and matching of tokens is the same for the CPN and MPN, for brevity purposes only the token preparation and matching procedures used for the MPN will be described. Hence, all of the flow chart steps, variables and constants make reference to the MPN token generation, matching and grading process. It should be noted, however, when the flow charts are used for the preparation and matching of tokens for the CPN, the flow chart would reflect the equivalent CPN type labels, variables and constants that are used by the CPN token generation, matching and grading process. Thus for example, in FIG. 2 "MPN list" in step 201 would be "CPN list," and "MPN" in steps 202 and 203 would be "CPN", and "MCP" in step 204 would be "CCP", etc. Similarly, the "MCP" type designations would be "CCP" type designations in FIGS. 3A and 3B.

The general operation of the server 100 involves three steps. In step 1, source data that represents the company parts numbers (CPN) are processed into the proper format by data preparation algorithm (FIG. 2) and stored as a source CPN list 111. In step 2, the source CPN list 111 is processed by token generating algorithm (FIGS. 3A and 3B) to generate the source CPN token list 112. In step three, the token matching and grading algorithm (FIG. 4) matches the search MPN token list 122 against the source CPN token list 112 to produce a proposed fuzzy match list which is outputted to the user. The proposed match list is considered fuzzy since it compares only "tokens" of search MPN token list 122 against source CPN token list 112. The user can then sort through the proposed match list to find the closest match.

The CPN token list 112 is generated for all of the company's CPNs that are used for the various different products produced by the company. The company's CPNs represents the MPNs of the many different parts manufacturers that supply parts for the various different products produced by the company. Since for each part, the company assigns a CPN that is different than a manufacturer's MPN, associating a CPN with a MFN is necessary when a Part Change Notice (PCN) must be processed. To speed up this process, the source CPN token list 112 is prepared, ahead of the time needed, for each product produced by the company. Thus for each company product, it is this source CPN token list 112 against which tokens prepared for each of the different MPN parts that each manufacturers supplies for that product is matched. Thus, when a Part Change Notice must be processed only the manufacturers MPN data needs to be processed in real time by server 100.

The manufacturers MPN data is processed when needed using steps 1A and 2A that are essentially the same processing as used in the CPN data processing steps 1 and 2, respectively. This would happen illustratively when processing a Part Change Notice PCN. In step 1, search data from the PCN, which represents the manufacturers parts numbers (MPN), are prepared into the proper format by data preparation algorithm (FIG. 2) and stored as a search MPN list 121. In step 2, each MPN of the search MPN list 121 is processed by token generating algorithm (FIGS. 3A and 3B) to generate the search MPN token list 122 for that MPN. In step three, the token matching and grading algorithm (FIG. 4) matches the tokens of each MPN of the search MPN token list 122 against the source CPN token list 112 to produce a propose match list which is then outputted to the user.

Figure 2:
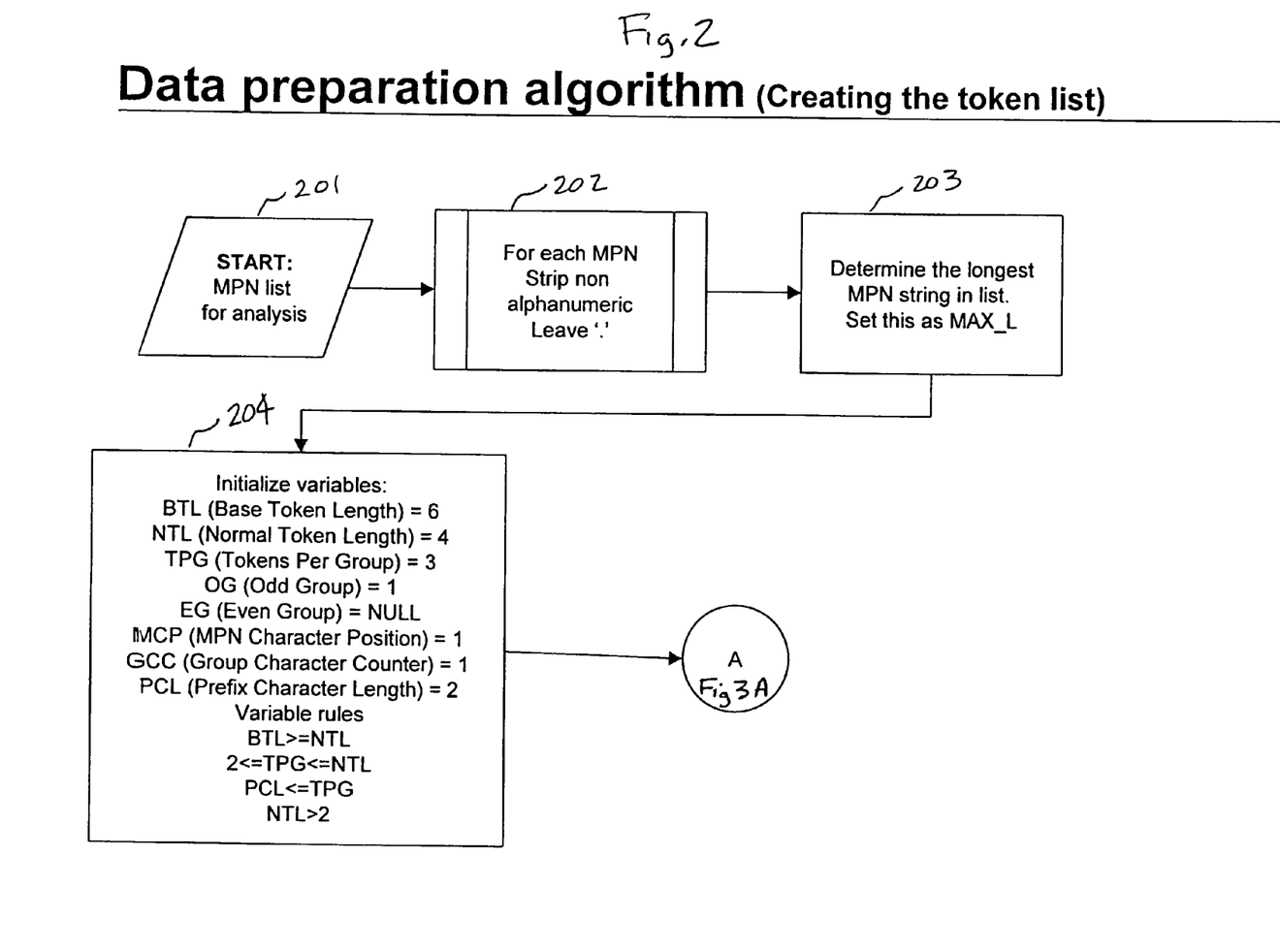
FIG. 2 is an illustrative flow chart of a data preparation algorithm.

With reference to FIG. 2 the operation of the data preparation algorithm is described. In step 201, a MPN list (a list of all search MPNs) is received for analysis. In step 202, for each MPN item character string the non-alphanumeric characters (other than a period".") are removed to form a continuous character string. In step 203, the longest MPN string in the list is designated MAX_L. In step 204, the various variables utilized in the token generating algorithm (FIGS. 3A and 3B) and the token matching and grading algorithm (FIG. 4) are initialized. The initial constants and variable values include: BTL (Base Token Length)=6, NTL (Normal Token Length) =4; TPG (Tokens Per Group)=3; OG (odd Group)=1; EG (Even Group)=NULL; MCP (MPN Character Position)=1; GCC (Group Character Count)=1; PCL (Prefix Character Length)=2. The rules for the variable are BTL>=NTL; 2<=TPG<=NTL; PCL<=TPG; NTL>2.

Note that there are several constant values in step 204 that are selected ahead of time for a particular type of CPNs and MPNs. These constants are selected to enable the server to match CPNs and MPNs even though they may have different Prefix and Suffixes. The Base Number (located between the Prefix and Suffix) is primarily used to identify matches between the CPNs and MPNs, but the Suffix may provide additional details about the physical part that may help in identification process. Thus, for example, the constant value BTL (the base token length) is selected ahead of time and is based on the "base number" that is common between the CPN and MPN. The constant TPG (Tokens Per Group) is selected to be greater than the number of characters in the Prefix of either the CPN or MPN. The constant NTL (Normal Token Length) is selected to be able to search a suffix that provides additional details about the physical part. Of course, while the values of BTL, TPG, and NTL will be constant for a particular type of MPN part from a manufacturer, it can vary among MPN part types and manufacturer. In the particular example to be discussed, the constant "base number" is a set of consecutive characters that are found in the MPNs and any matching CPNs (usually less than 6). This "base number" character groups are found in the same general area of both the CPN and MPN strings, but not necessarily in the same starting character position.

Thus in our example MPN and CPN, the "base number" (shown in bold) of search MPN is 0805CS-820XKBC which would have an initial match to the source CPN of ZZ0805CS-820XKBC. A match can be found since there is a string of 6 characters "0805CS" in MPN that is sequentially matched against character positions 1-6, 2-7, and 3-8 of the first 8 characters of the CPN.

As another example, consider an electronic part that may include a "logic part number" that is formatted to have the same identifying code format. For example, a logic part number SN74LS85NDS from one manufactures would match to: 74LS85; DM74LS85M; N74LS85DT (other logic part numbers of other manufacturers). Since the 74LS85 portion is a common "base number" among all of these MPNs, it would be used as the "base token." Each of the manufactures part number also includes a Prefix of 0-2 characters and a Suffix of 0-3 characters. Hence, in this example the values of BTL=6 (the Base Token Length); TPG=3 (Tokens Per Group), ensures that the "base token" can be shifted 1, 2, or 3 character positions and hence slide past the Prefix position and overlap with the base token of the CPN; subsequent tokens are evaluated on a group by group basis. When the group allows 3 characters (as what is used in this example) and the groups have some overlap, then tokens can match by relative position both in the base token group and all subsequent token groups.

Figure 3A:
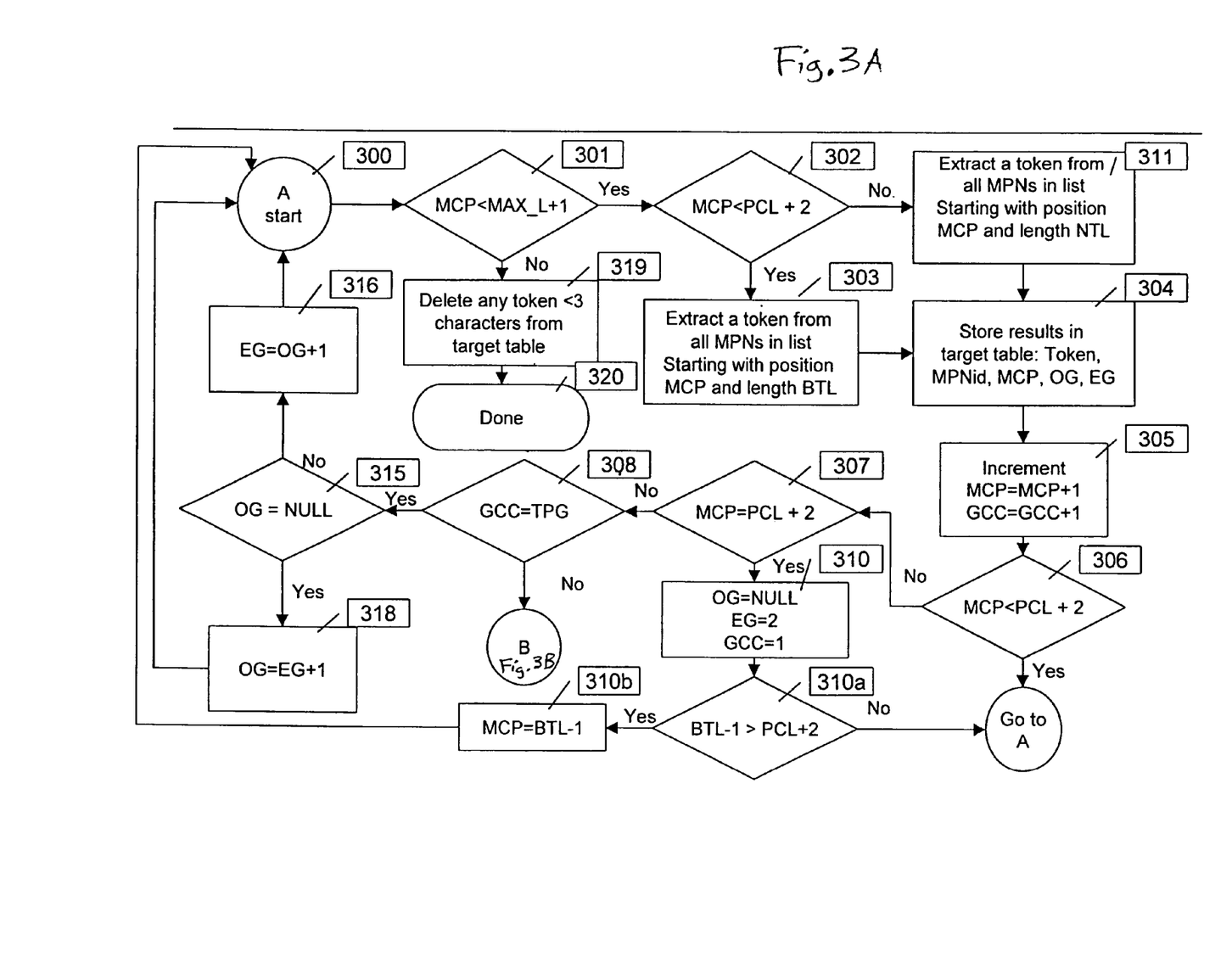
FIGS. 3A and 3B are illustrative flow chart of a token generating algorithm.
Figure 3B:
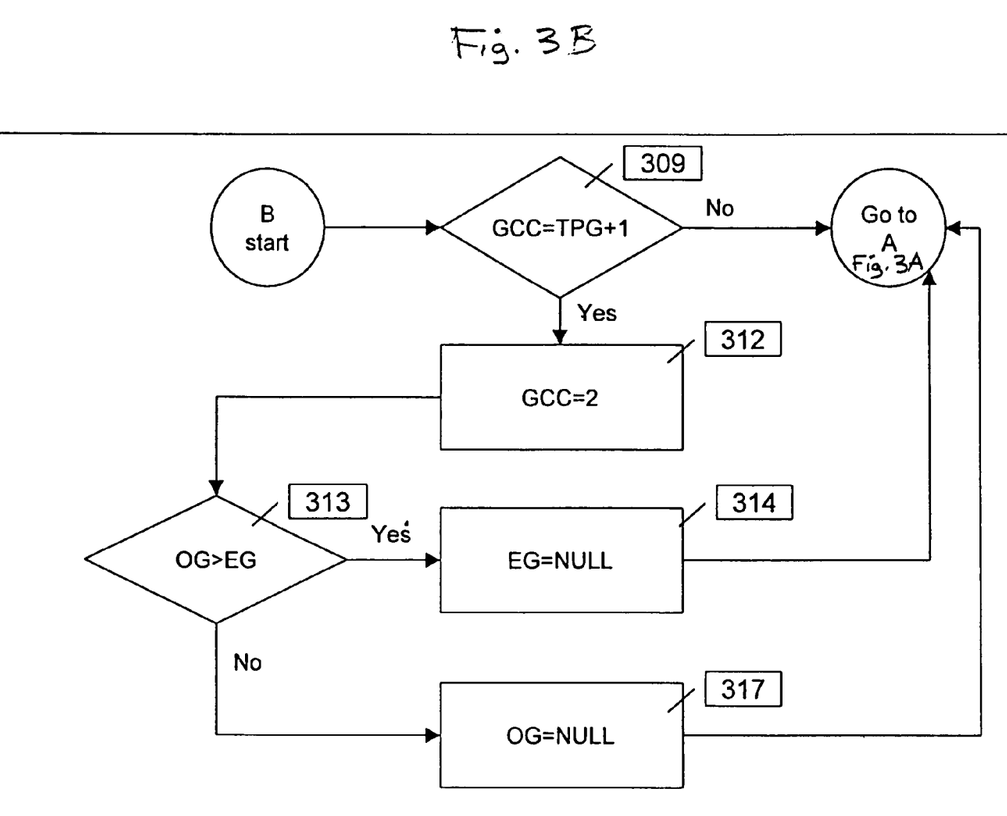

Returning to FIG. 2, after step 204 is completed, control transfers to "A" of FIG. 3A, the token generating algorithm (FIGS. 3A and 3B). In the following description, the operations performed by the algorithms of FIGS. 2, 3A, 3B, and 4 are described in comparing an illustrative starting MPN string 0805CS-820XKBC with a CPN string ZZ0805CS820XKBC. In this example, we describe only how the starting MPN string 0805CS-820XKBC is processed by the data preparation algorithm of FIG. 2 and the token generating algorithm of FIGS. 3A and 3B. Since the same data preparation algorithm of FIG. 2 and the token generating algorithm of FIGS. 3A and 3B are used to process both the CPN and MPN strings, to avoid duplicating the description we assume that the algorithms of FIGS. 2, 3A, and 3B have already generated the CPN tokens. Note for the CPN tokens, the algorithms of FIGS. 2, 3A, and 3B ends with the Done step 320, while for the MPN tokens when the Done step 320 is reached control passes to the token matching and grading algorithm of FIG. 4. Thus, for the illustrative source CPN string ZZ0805CS820XKBC the various tokens generated are shown in column 710 to include base (Group 1) tokens 711, Group 2 tokens 712, Group 3 tokens 713, Group 4 tokens 714, and Group 5 tokens 715.

The illustrative starting MPN string 0805CS-820XKBC is processed, in step 202 of data preparation algorithm of FIG. 2, to remove the non-alphanumeric character "-" producing the converted MPN string 0805CS820XKBC, which is the search MPN. In step 203, we assume that the converted MPN string 0805CS820XKBC is also the longest so MAX_L=13 (Since in our example our MPN list includes only MCN string 0805CS820XKBC). In step 204 all the variables are set at the values shown. Control then passes, via control point "A," to the token generating algorithm of FIGS. 3A and 3B.

Figure 4:
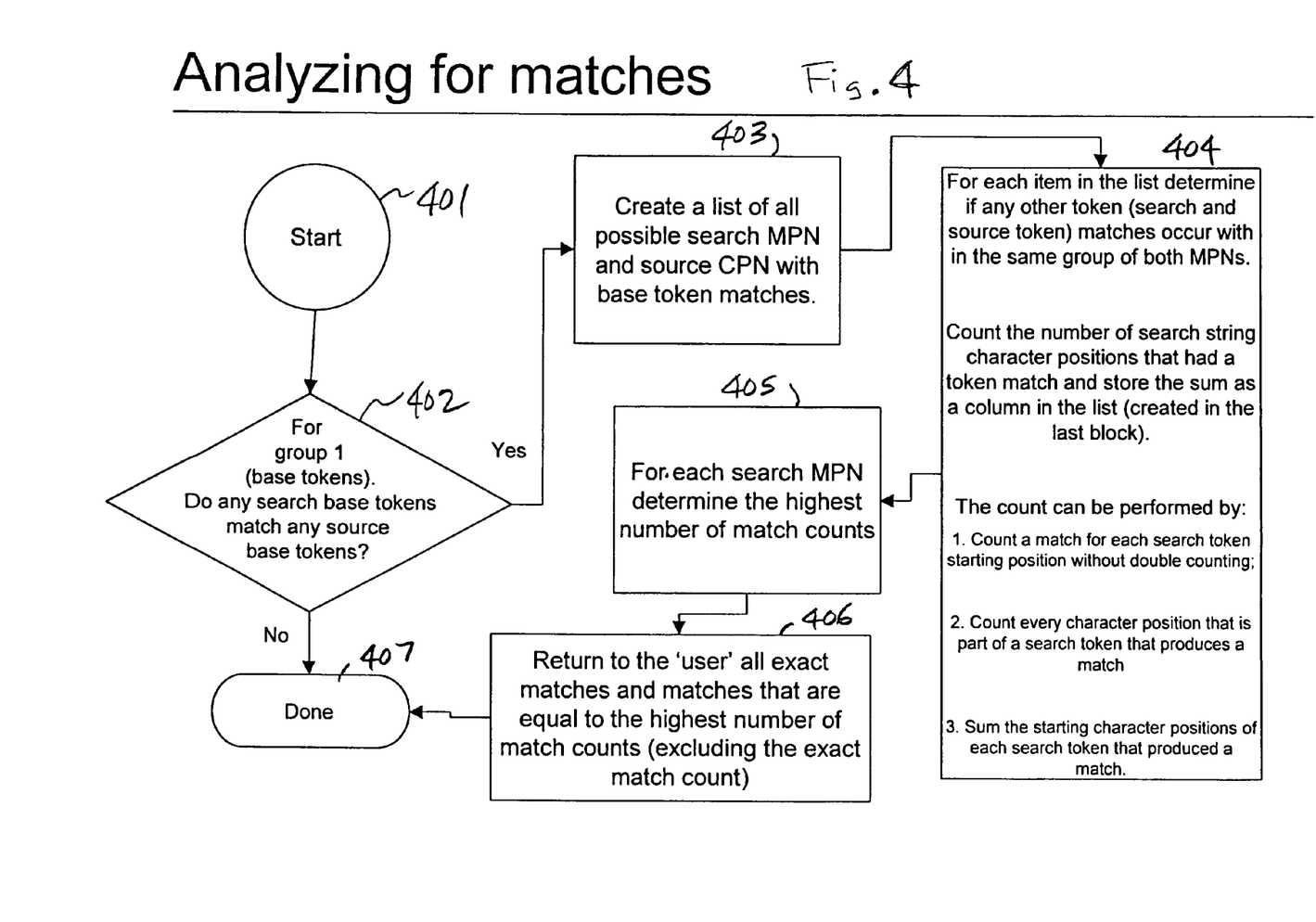
FIG. 4 is illustrative flow chart of a token matching and grading algorithm.
Figure 5:
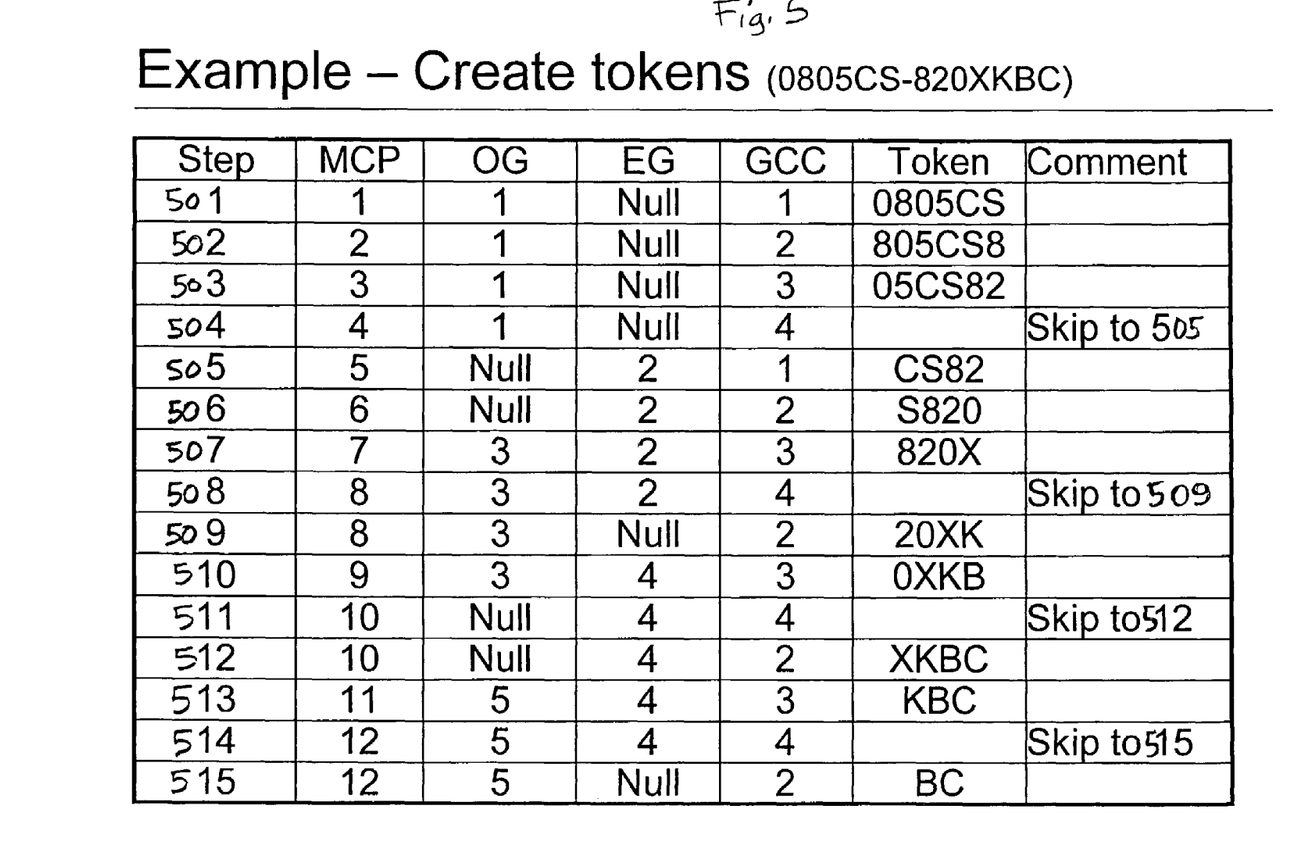
FIG. 5 is a chart showing the tokens generated and variable values during token generation trips through the token generating algorithm of FIGS. 3A and 3B.

The following description makes joint reference to FIGS. 3A, 3B, 4, 5, and 6. At the start of the token generating algorithm of FIGS. 3A and 3B, the state of the variables prior to the first trip (first pass) through the flows charts to generate the first token 0805CS is shown in row 501 of FIG. 5. In the decision step 301 in FIG. 3A, since MCP=1 it is less than MAX_L+1=14 and control passes to decision step 302. In step 302 since MCP=1 is less than PCL+2=4, control passes to step 303, where a base token 0805CS is extracted from the MPNs list (i.e., the MCN string 0805CS820XKBC) starting from character position MCP=1 and extending for Base Token Length, BTL=6. In step 304, the first extracted base token 0805CS is stored in Target Table 600, as token 601 in the column Token Reference identification—(MPNid) 610. The MPNid serves as an arbitrary identification number assigned by the database to keep track of all of the tokens used by the search MPN (i.e., MPN string 0805CS820XKBC ). In Target table 600, a corresponding entry for token 601 is made in each of the columns Token 620, Token Length 630, MCP (MPN character position) column 640, Odd Group numbers column 650, and Even Group numbers column 660. Control then passes to step 305 where MCP is set equal to MCP+1 (i.e., 2) and GCC (Group Character Count) =GCC+1 (i.e., 2). In decision step 306, since MCP is less than PCL+2 control returns to transfer point A Prior to the second trip through the flows charts to generate the second base token 805CS8 the states of the variables are shown in row 502 of FIG. 5. The second base token 502 of FIG. 5 is generated following the same sequence of steps 301 through 309 through the flow charts of FIGS. 3A and 3B that generated the first base token 0805CS. Thus, in step 303 second base token extends BTL=6 characters from character position MCP=2 of converted MPN string 0805CS820XKBC generating 805CS8. This second base token 602 of Table 600. Thus, the second base token will begin at the next adjacent sequential character position 2 (MCP=2) of the converted MPN character string.

After this second trip through the flows charts and prior to the third trip to generate the third base token 05CS82, the states of the variables are shown in row 503 of FIG. 5. The third base token 05CS82 is generated following the same sequence of steps 301 through 307. Note the states of the variables after step 305 are shown in row 504 of FIG. 5. This third base token 603 is shown in Table 600. Thus, the third base token begins at the third character position (MCP=3) of the converted MPN character string. In decision step 307, since MCP =4 is equal to PCL+2, control passes to step 310 (to change variable values) and then to decision step 310a where it is determined if BTL−1 or PCL+2 is larger. MCP is then set to the larger of the two and then control continues to transfer point "A" of FIG. 3A. After this third trip through the flow charts and prior to the fourth trip through the flows charts to generate the fourth token CS82, the state of the variables are shown in row 505 of FIG. 5. The fourth token CS82 is the first non-base token and the first token of group 2, see column 660 of FIG. 6. The fourth token CS82 is generated following the same sequence of steps 301 through 302. At decision step 302, however, since MCP=5 is not less than PCL+2, step 311 is performed where a token CS82 is generated having a length NTL=4 and starting from character position MCP=5. In step 304 the fourth token 604 is stored in Table 600. Steps 305-307 are then performed. In decision step 307 since MCP is not equal to PCL=2, then decision step 308 is performed and since GCC is not equal to TPG, control to transfer point "B" of FIG. 3B. In FIG. 3B since decision step 309 condition is not met control returns to transfer point "A" of FIG. 3A. Note that the fourth token and each of the group 2 tokens begin at a different adjacent sequential character position that does not include the TPG sequential character positions of the converted MPN character string used by the MPN base tokens. That is the fourth token cannot begin at any of the character positions MPC=1-3 of the MPN character string used by the base tokens 1-3. And a fifth token cannot begin any of the character positions MPC=1-3 or the position 5 of the MPN character string (which is used by the fourth token).

Figure 6:
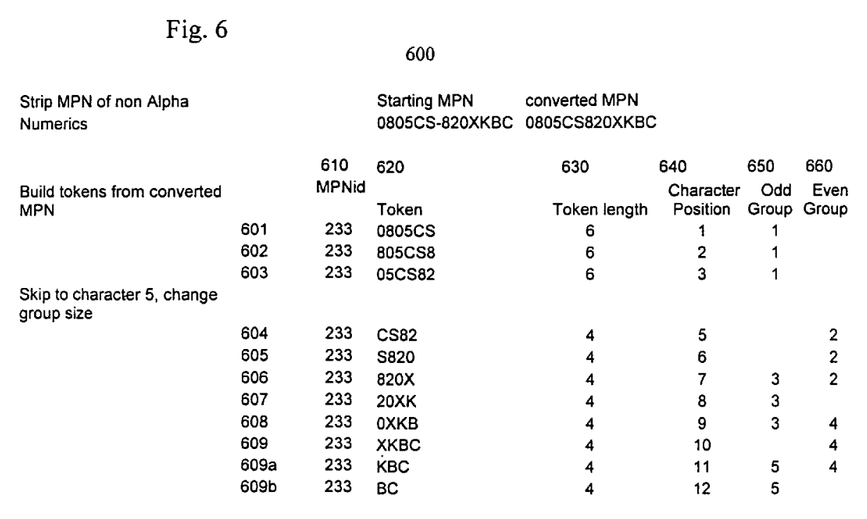
FIG. 6 shows, for an illustrative MPN, the various tokens that are produced by the token generating algorithm of FIGS. 3A and 3B.

After this fourth trip through the flows charts and prior to the fifth trip through the flows charts to generate the fifth token S820, the states of the variables are shown in row 506 of FIG. 5. The fifth token S820 is generated following the same sequence of steps as for generation of the fourth token CS82, namely, 301,302, 311, 304-309, 312, 313 and then back to transfer point "A" of FIG. 3A. In step 304 the fifth token 605 was stored in Table 600.

After this fifth trip through the flows charts and prior to the sixth trip through the flows charts to generate the sixth token 820X, the states of the variables are shown in row 507 of FIG. 5. The sixth token 820X is generated following the same sequence of steps as for generation of the fourth and fifth tokens, namely, 301,302, 311, 304-308. Note the states of the variables after step 305 are shown in row 508 of FIG. 5. In decision step 308 since GCC is not equal to TPG then control passes to transfer point "B" of FIG. 3B. In decision step 309, since GCC=TPG+1=4, then step 312 and decision step 313 are performed. In decision step 313, since OG>EG then step 314 sets EG=NULL and control is transferred to transfer point "A" of FIG. 3A. The fourth, fifth, and sixth tokens make up the group 2 tokens (see column EG at rows 505-507 of FIG. 5); this is also shown as column 660 in Table 600 of FIG. 6. Note, the sixth token 606 is also the first token of group 3 (see column OG at row 507 of FIG. 5), and as shown in column 650 of FIG. 6.

After this sixth trip through the flows charts and prior to the seventh trip through the flows charts to generate the seventh token 20XK, the states of the variables are shown in row 509 of FIG. 5. The seventh token 20XK is generated following the sequence of steps 301,302, 311, 304-308, 315, 316, and then back to transfer point "A" of FIG. 3A. In step 304 the seventh token 607 was stored in Table 600. The seventh token is the second token of group 3, as shown in column 650 of FIG. 6. Note also that the seventh token and the eighth token each begin at a different adjacent sequential character position (MCP position 8 and 9, respectively) that does not include the MCP positions used by the MPN base tokens of group 1 or the tokens of group 2.

After this seventh trip through the flows charts and prior to the eighth trip through the flows charts to generate the eighth token 0XKB, the states of the variables are shown in row 510 of FIG. 5. The eighth token 0XKB is generated following the sequence of steps 301,302, 311, 304-308, 312, 313, 317, and then back to transfer point "A" of FIG. 3A. In step 304, the eighth token 608 was stored in Table 600. The eighth token 0XKB is the third token of group 3, as shown in column 650 of FIG. 6 and also the first token of group 4, as shown in column 660 of FIG. 6. Note the states of the variables after step 305 are shown in row 511 of FIG. 5.

After this eighth trip through the flows charts and prior to the ninth trip through the flows charts to generate the ninth token XKBC, the states of the variables are shown in row 512 of FIG. 5. The ninth token XKBC is generated following the sequence of steps 301, 302, 311, 304-309, and then back to transfer point "A" of FIG. 3A. In step 304, the ninth token 609 was stored in Table 600. The ninth token XKBC is the second token of group 4, as shown in column 660 of FIG. 6. Note also that the ninth token XKBC and the tenth token KBC each begin at a different adjacent sequential character position (MCP position 10 and 11, respectively) that does not include the MCP positions used by the MPN base tokens of group 1 or the tokens of group 2 or group 3.

After this ninth trip through the flows charts and prior to the tenth trip through the flows charts to generate the tenth token KBC, the states of the variables are shown in row 513 of FIG. 5. The tenth token KBC is generated following the sequence of steps 301,302, 311, 304-308, 315, 318, and then back to transfer point "A" of FIG. 3A. In step 304 the tenth token KBC was stored 609a in Table 600. The tenth token KBC is the third token of even group 4, as shown in column 660 of FIG. 6 and also the first token of odd group 5, as shown in column 650 of FIG. 6. Note the states of the variables after step 305 are shown in row 514 of FIG. 5.

After this tenth trip through the flows charts and prior to the eleventh trip through the flows charts to generate the eleventh token BC, the states of the variables are shown in row 515 of FIG. 5. The eleventh token BC is generated following the sequence of steps 301, 302, 311, 304-309, and then back to transfer point "A" of FIG. 3A. In step 304 the eleventh token 609b was stored in Table 600. The eleventh token BC is the second token of group 5, as shown in column 650 of FIG. 6. Note also that the eleventh token begins at a different adjacent sequential character position (MCP position 12) that does not include the MCP positions used by the MPN base tokens of group 1 or the tokens of groups 2, 3, or 4.

Figure 7:
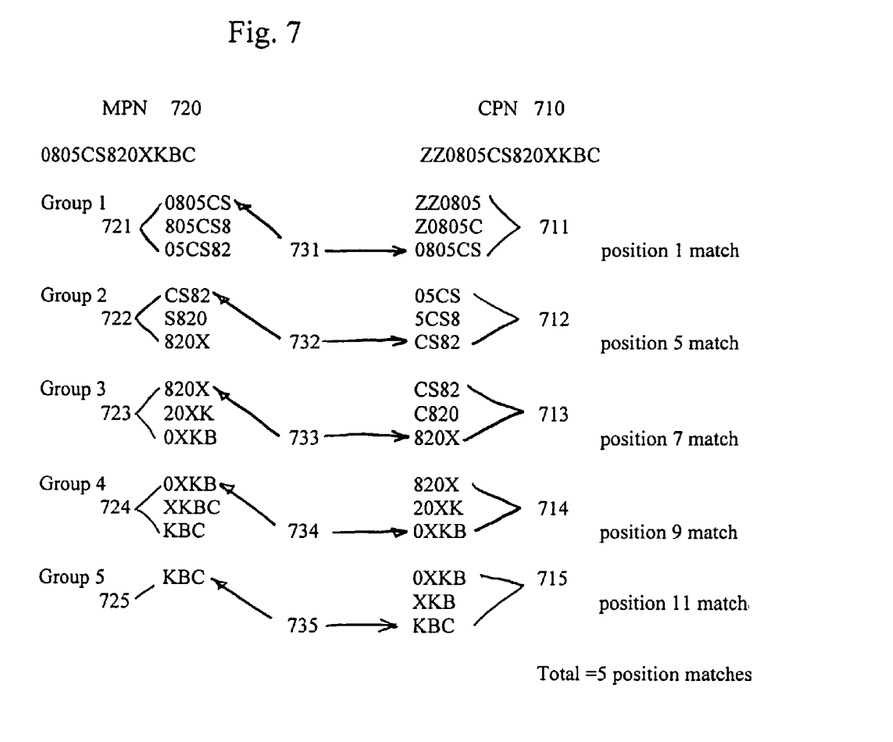
FIG. 7 compares, for an illustrative CPN and MPN, the various tokens that are produced by the token generating algorithm of FIGS. 3A and 3B and the total number of character position matches between the CPN and MPN tokens, as determined by the token matching and grading algorithm of FIG. 4.

After this eleventh trip through the flows charts and prior to the twelfth trip through the flows charts to generate a twelfth token the variable MCP=13. Thus when decision step 301 is performed it fails and in step 319 all the tokens<3 (i.e., token BC) are deleted from the Table 600 and in step 320, the process is Done. Thus, in the above description, every search MPN character is used to generate one or more search tokens. As previously noted, the process is Done only for the CPN tokens generating process, for the MPN tokens when the Done step 320 is reached control passes to the token matching and grading algorithm of FIG. 4 After the processing by flow charts of FIGS. 3A and 3B, as shown in FIG. 7 the Search MPN tokens 720 and the Source CPN tokens 710 are grouped as groups 1-5. With reference to FIG. 4, there is shown the illustrative flow chart of a token matching and grading algorithm which looks for matches in the five groups of the Search MPN tokens 720 and the Source CPN tokens 710. In step 401, the process starts and in decision step 402, the group 1 base tokens of the list of Search MPN tokens 720 and the Source CPN tokens 710 are matched. As shown by 731 of FIG. 7, a base token 0805CS is found to match in both group 1 of the list of Search MPN tokens 720 and the Source CPN tokens 710. Note if no base token match was found then in step 407 the process is Done. Since we have a base token match, control passes to step 403 where a Match list is created of all possible search MPNs and source CPNs having base tokens matches. Note, since in our example our CPN and MPN list included only one character string, our match list includes only one base token 0805CS. In actual applications, of course, there would be a search MPN list and source CPN list that would probably produce a base token match list of greater than one. In step 404, for each item of the base token Match list we check if there are any other non-base token matches that occur. This Match list is generated when the search MPN is matched against the source MPNs. This Match list will store a list of potential matches along with a 'score' for each match. The score or match count is used to determine what exact matches or near matches are returned to the user to see (in step 406).

Returning to our example, we have non-base token matches CS82, 820X, 0XKB, and KBC, which occurred in groups 2-5 and identified as matches 732-734, respectively. In step 404 we also perform a count of the matching tokens. This count can be performed by one of the following techniques:

1. Counting every character position that is part of a search token that produces a match
2. Counting a match for each search token starting position without double counting;
3. Summing the starting character positions of each search token that produced a match In our example, in step 404 we used the first technique whereby we count the number of search string character positions that had a token match and store the sum. In our example the base token match 731 included 6 character positions (position 1), the match 732 included character position (position 5), the match 733 included 1 character position (position 7), the match 734 included 1 character positions (position 9), and the match 735 includes 1 character position (position 11). Thus the total search MPN string character position matches (or MPN position matches) is 5. In step 405, for each search MPN we determine the CPNs from the CPN list that have the highest number of net MPN position matches as the most likely fuzzy match(es) for the search MPN. Since in our example the CPN list had only one CPN item, our search MPN produced only one fuzzy CPN match. In a general application where there are many CPNs, the number of fuzzy CPN matches may be more than one. Desirably, the number of fuzzy CPN matches should be as small as possible to enable the user to more easily select the "exact" CPN match(es). In step 406, the server would output to the user all fuzzy CPN matches that have the highest net MPN position matches as well as any exact matches. The dual criteria are so that if an exact match is found that near matches are also returned. While an exact match is desirable it is possible that a near matches are also useful (For example when a duplicate part is accidentally created when character is input incorrectly). While the previous description described an illustrative preferred embodiment of the present invention, other novel embodiments can be implemented. The preferred embodiment generates as many tokens as is possible from the MPN, in the example it only generated five groups of tokens (one base and four non-base token groups) that covered each character position of the converted CPN and MPN character strings, alternate embodiments may be utilized that use less than a token for every character position. In such an application, the operations performed in FIGS. 3A, 3B and 4 would be adapted to only generate and match to base tokens. For example, one embodiment may utilize only the base token group. In such an embodiment, the value of "max_L" (which indicates the number of times the FIG. 3 loop has been run) used in step 203 of FIG. 2 and in step 301 of FIG. 3A would be set to TPG. In this manner, the process would terminate in step 301 of FIG. 3A when the MCP equals 3. As result, only a CPN character string that has the highest number of character position matches to a MPN base token would be outputted to the user in step 406 of FIG. 4. While the resulting CPN character string match list would be longer (more fuzzy) than when using the preferred embodiment (all five groups), there may be applications where such a technique may be useful. In such an application, the operations performed in FIGS. 3A, 3B and 4 would be adapted to only generate and match to base tokens.

In another similar embodiment, the base token and the first non-base token group (group 2) can be used. In this embodiments, the value of "MAX_L" used in step 203 of FIG. 2 and in step 301 of FIG. 3 would be set to TPG plus either BTL−1 or PCL+2 which every is greater (in this example would result in 8). Thus, the process would terminate in step 301 of FIG. 3A when the MCP equals 9. Thus, only CPN character strings that have the highest number of character position matches to the MPN base token group and non-base token group (group 2) would be outputted to the user in step 406 of FIG. 4. Such an embodiment would likely produce less CPN character strings, a more refined search (less fuzzy) than the embodiment using only the base token matches.

In yet another embodiment, the base token and the first and second non-base token groups (groups 2 and 3) can be used. In this embodiments, the value of "MAX_L" used in step 203 of FIG. 2 and in step 301 of FIG. 3 would be set to 2*TPG plus either BTL−1 or PCL+2 which every is greater (in this example would result in 11). Thus, the process would terminate in step 301 of FIG. 3A when the MCP equals 12. Thus, only CPN character string that have the highest number of character position matches to the MPN base token group and the two non-base token groups (groups 2 and 3) would be outputted to the user in step 406 of FIG. 4.

The present invention eliminates the problems associated with the previously discussed manual wildcard approach. As a result it drastically reduces the user's quite time-consuming work of manually identifying whether each of a plurality of MPNs has matches in a CPN database. It also greatly reduces the probability for making part (MPN) identification errors, which could be quite expensive to rectify.

Moreover, while the present invention has been discussed with regards to MPNs that are electronic component part numbers, the technique can more generally be used to match other types of part numbers or any string of alphanumeric source or search characters. It is also useful in finding individual parts or converting a list of parts used in a product assembly from one design house to another. Where part numbers are similar but don't match exactly. Such a technique may be useful, for example, in establishing a second parts source list. Thus, various modifications of the described embodiments, as well as other embodiments of the invention, which are apparent to persons skilled in the art to which the inventions pertain, are deemed to lie within the principle and scope of the inventions as expressed in the following claims.

Although the steps in the following method claim are recited in a particular sequence, unless the claim recitations otherwise imply a particular sequence for implementing some or all of those steps, those steps are not necessarily intended to be limited to being implemented in that particular sequence.

I claim:

1. A computer implemented apparatus for searching for a search character string in a source character string database, the search and source character strings each including a prefix [P], a base [B] and a suffix [S] segment, comprising:
   a means for stripping from an inputted search character string, a predefined group of non-alphanumeric of characters to generate a converted search character string;
   a means for generating a first group of search tokens, comprising a prescribed number of 'search' base tokens from the converted search character string, wherein the 'search' base tokens serve as search tokens, and wherein the number of 'search' base tokens in the first group of tokens is at least equal to the number of characters in a prefix segment of the converted search character string,
   each 'search' base token has a fixed base token length, wherein the fixed base token length is determined by a prescribed number of contiguous characters in the converted search character string and
   the first 'search' base token begins at a first character position of the converted search character string and each subsequent 'search' base token begins at an adjacent sequential character position of the converted search character string;
   a means for generating a source token database from a converted source character string generated from a source character string, and storing in a memory location of a computer, said generating means further generating a predetermined number of 'source' base tokens, wherein the 'source' base tokens serve as source tokens, and wherein
   the number of 'source' base tokens is at least equal to the number of characters in a prefix segment of the converted source character string,
   the number of the 'source' base tokens is substantially the same as the number of the 'search' base tokens,
   each 'source' base token has said fixed base token length, wherein the fixed base token length is determined by the prescribed number of contiguous characters in the converted source character string, and
   the first 'source' base token begins at a first character position of the converted source character string and each subsequent 'source' base token begins at an adjacent sequential character position of the converted source character string;
   a means for searching the source token database using each of the 'search' base tokens and identifying one or more 'source' base tokens that match each of the 'search' base tokens, wherein for each match found, the searching means also identifies a character position in the converted search character string at which the match occurs; and
   a means for outputting to a user, a list of one or more 'source' base tokens that match the 'search' base tokens and the corresponding character positions at which the match occurs.

2. The apparatus of claim 1 operable on the converted search character string when least one 'source' base token that matches a 'search' base token is identified, the apparatus further comprising:
   a second means for generating one or more predetermined number of second groups of search tokens, wherein the number of second groups is less than or equal to the ratio of total number of characters in the converted search character string to the number of 'search' base tokens, wherein
   each second group the converted search character includes a prescribed number of 'search' non-base tokens generated from string,
   each 'search' non-base token having a fixed non-base token length the fixed non-base token length is determined by a prescribed number of contiguous characters which is less than the base token length,
   each 'search' non-base token begins at a different adjacent sequential character position that does not include the base token length sequential character positions of the converted search character string used by the 'search' base tokens;

a means for generating in the source token database, one or more second groups of source tokens, such that the number of second groups is less than or equal to the ratio of total number of characters in the converted search character string to the number of 'search' base tokens, wherein each second group includes a prescribed number of 'source' non-base tokens generated from the converted source character string, each 'source' non-base token has said fixed non-base token length wherein the fixed non-base token length is determined by the prescribed number of contiguous characters in the converted source character string, each 'source' non-base token begins at a different adjacent sequential character position that does not include the base token length sequential character positions of the converted source character string used by the 'source' base tokens; and wherein the searching means also searches the source token database using each of the 'search' non-base tokens and identifies one or more 'source' non-base tokens that match each of the 'search' non-base tokens and combines the number of one or more 'source' non-base tokens matches with the number of one or more 'source' base tokens matches, to determine the one or more source character strings that produces the highest number of character position matches with the search character string; and wherein outputting means outputs to a user, a list of one or more source character string that produced the highest number of character position matches with the search character string.

3. The apparatus of claim 1 wherein the searching means uses an algorithm selected from a set of algorithms which (a) count a match for each search token starting position without double counting;

(b) count every character position that is part of a search token that produces a match; and (c) sum the starting character positions of each search token that produced a match.

4. A computer implemented method for searching for a search character string in a source character string database, the search and source character strings each including a prefix [P], a base [B] and a suffix [S] segment, the method comprising the steps of:

generating from the source character string, a converted source character string through the effect of removing a predetermined group of non-alphanumeric characters;

storing in a source token database in a memory location of a computer, a prescribed number, of 'source' base tokens generated from the converted source character string wherein the source base tokens serve as source tokens, and wherein the number of 'source' base tokens is at least equal to the number of characters in a prefix segment of the converted source character string, each 'source' base token has a fixed base token length wherein the fixed base token length is determined by a prescribed number of contiguous characters in the converted source character string, and the first 'source' base token begins at a first character position of the converted source character string and each subsequent 'source' base token begins at an adjacent sequential character position of the converted source character string;

stripping from an inputted search character string, a predefined group of non-alphanumeric characters to generate a converted search character string;

generating at least a first group, of tokens comprising a prescribed number of 'search' base tokens from the converted search character string, wherein the 'search' base tokens serve as search tokens, and wherein the number of 'search' base tokens in the first group of tokens is at least equal to the number of characters in a prefix segment of the converted search character string, the number of the 'search' base tokens being substantially equal to the number of the 'source' base tokens, each 'search' base token has the fixed base token length wherein the fixed base token length is determined by a prescribed number of contiguous characters, in the converted search character string, and the first 'search' base token begins at a first character position of the converted search character string and each subsequent 'search' base token beings at an adjacent sequential character position of the converted search character string;

searching for each of the 'search' base tokens in the token source database and identifying one or more 'source' base tokens that match each of the 'search' base tokens wherein for each match found, the searching step also identifies a character position in the converted search character string at which the match occurs; and outputting to a user, a list of one or more 'source' base tokens that match the 'search'base tokens and the corresponding character positions at which the match occurs.

5. The method of claim 4 operable on the converted search character string when at least one 'source' base token that matches a 'search' base token is identified, the method further comprising the steps of:

generating one or more predetermined number of second groups of search tokens, wherein the number of second groups is less than or equal to the ratio of total number of characters in the converted search character string to the number of search base tokens, each second group of search tokens further including;

a prescribed number of 'search' non-base tokens generated from the converted search character string, wherein each 'search' non-base token has a fixed non-base token length wherein the non-base token length is determined by a prescribed number of contiguous characters within the converted search character string, the non-base token length is equal to or less than the base token length, and each 'search' non-base token begins at a different adjacent sequential character position that does not include the base token length sequential character positions of the converted search character string used by the 'search' base tokens;

storing in the source token database, one or more predetermined number of second groups of 'source' tokens, wherein the number of second groups is less than or equal to the ratio of total number of characters in the converted search character string to the number of search base tokens, each second group of source tokens further including;

a prescribed number of 'source' non-base tokens generated from the converted source character string, wherein each 'source' non-base token said has the fixed non-base token length wherein the non-base token length is determined by a prescribed number of contiguous characters within the converted source character string, and each 'source' non-base token begins at a different adjacent sequential character position that does not include the base token length sequential character positions of the converted source character string used by the 'source' base tokens;

the searching step includes searching the source token database using each of the 'search' non-base tokens and identifying one or more 'search' non-base tokens that match each of the 'search' non-base tokens; and combining the number of one or more 'search' non-base tokens matches with the number of one or more 'search' base tokens matches, and determining the one or more source character strings that produces the highest number of character position matches with the search character string;

such that the outputting step outputs to a user, a list of one or more source character string that produced the highest number of character position matches with the search character string.

6. The method of claim 4 wherein the matching step uses an algorithm selected from a set of algorithms for;
(a) counting a match for each search token starting position without double counting;
(b) counting every character position that is part of a search token that produces a match; and
(c) summing the starting character positions of each search token that produced a match.

* * * * *